Sept. 24, 1957  R. J. NES  2,807,461
HYDRAULIC OPENERS FOR HINGED HATCH COVERS
Filed April 3, 1957  2 Sheets-Sheet 1

INVENTOR
RAGNAR JONAS NES
BY
Wenderoth, Lind & Ponack
Attys.

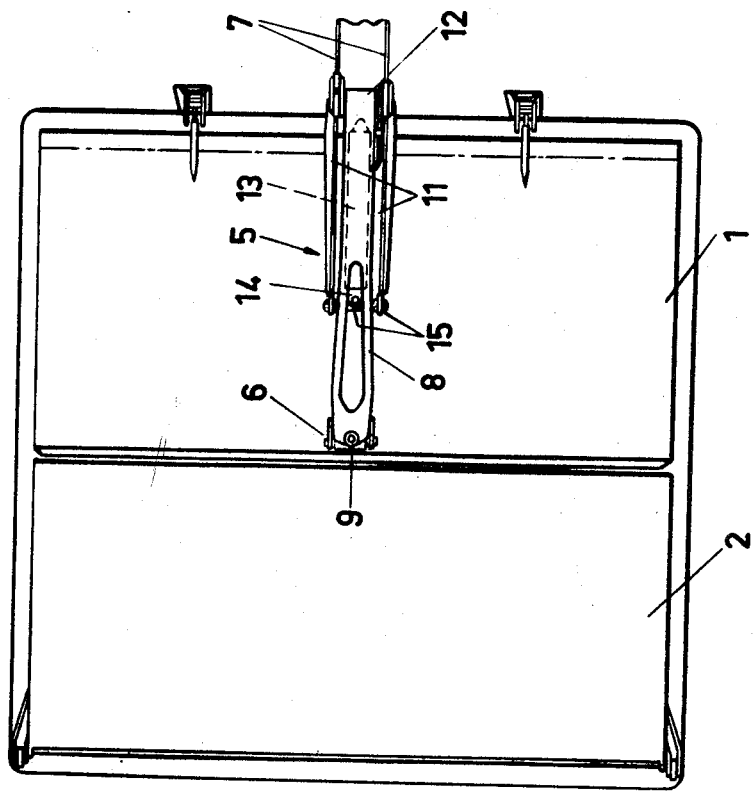

United States Patent Office 2,807,461
Patented Sept. 24, 1957

2,807,461

HYDRAULIC OPENERS FOR HINGED HATCH COVERS

Ragnar Jonas Nes, Bergen, Norway, assignor to Kockums Mekaniska Verkstads Aktiebolag, Malmo, Sweden, a corporation of Sweden Application April 3, 1957, Serial No. 650,464

Claims priority, application Sweden April 26, 1956

3 Claims. (Cl. 268—75)

This invention relates to a hydraulic opener for hinged hatch covers, of a novel design which satisfies the demands made on such a mechanism more fully than the hitherto suggested openers.

Hydraulic openers for hatch covers generally include a hydraulic plunger motor which is mounted as a strut between the hatch cover and the deck to swing the hatch cover open by direct expansive action. In such an arrangement the plunger motor will, however, always be situated within that area of or near the hatch opening which has to be freely accessible for the loading and unloading operations. It therefore constitutes a serious obstacle to these operations and is easily damaged.

The primary object of the invention is to provide a hydraulic opener for hinged hatch covers comprising a support fixedly arranged above the plane of the hatch cover at the hinged end thereof, a pulling link hingedly connected between the hatch cover and said support, said pulling link being composed of two overlapping parts and adjustable in length by the displacement of said parts in relation to each other, and a hydraulic plunger motor of expansive action interposed between the overlapping ends of said link parts to shorten the pulling link by its expanding movement.

This design provides a pulling, instead of a pushing, hatch cover opener and permits a better accommodation of the opener while retaining the expansively acting hydraulic plunger motor which is considerably cheaper to manufacture and less sensitive than a contractively acting plunger motor which at closed hatch cover would have the entire piston rod pushed out of the cylinder and consequently exposed to damages of varying nature, e. g. to corrosion by sea water.

It does not meet with any difficulties to mount the hatch cover opener according to the invention on old ships since such mounting does not require any change either of the deck or of the hatch covers but at the most a simple reinforcement which can be easily realized by welding.

Further objects and features of the invention will appear from the following description, reference being had to the accompanying drawings illustrating an embodiment of the hatch cover opener, chosen by way of example. In the drawings:

Fig. 2 is a plan view of the closed hatch cover.

Figure 1:
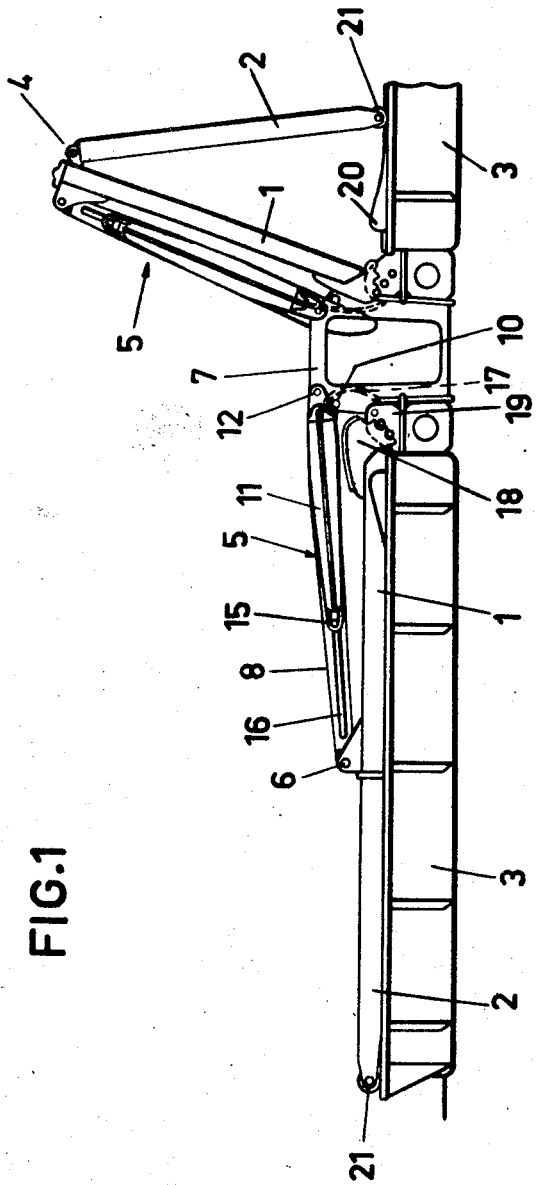
Fig. 1 is a side elevation of a closed and an almost entirely opened hatch cover, both of which are equipped with an opener according to the invention.

The hatch covers illustrated are composed in a manner known per se of two approximately equally large parts 1, 2 supported on a coaming 3 and held together by hinges 4, one part 1 having a hinge support at its end of the hatch opening so that the hatch cover can be opened by being swung upwards and simultaneously folded together, as is shown in the right-hand portion of Fig. 1.

The upward swinging movement is effected by means of a pulling link 5 connecting lug means 6 on the cover part 1 to a support 7 which is fixedly mounted on the deck at the hinged end of the hatch. The two hatch covers shown in Fig. 1 being opened back to back, they have a common support which is in the form of a portal so that it does not appreciably prevent employing the deck space between the hatches as a passage or for other purposes.

The pulling link 5 is composed of two parts. One of said parts is an elongate box 8 which has its one end anchored to the hatch cover lug means 6 by a universal joint connection 9 and its other end resting on a roller 10 in the support 7. The other part of the pulling link consists of a pair of pull rods 11 which are pivoted on a bolt 12 in the support 7 and extend over the hatch cover on both sides of the box 8.

A single-acting hydraulic motor comprising a cylinder 13 with a plunger 14 is mounted within the box 8, the closed end of the cylinder being hingedly connected to the box near the free end thereof. On the end projecting from the cylinder the plunger 14 carries a yoke 15 which projects through slits 16 in the side walls of the box 8 and on the ends of which the two pull rods 11 are pivoted.

The hydraulic motor is connected by a hose 17 to a pump device (not shown) equipped with the necessary valves including a throttle valve, and when the motor is supplied with hydraulic fluid so that the plunger is pressed outwardly, this results in a shortening of the pulling link 5 in that the box 8 is drawn towards the support 7 and the hatch cover is swung upwards and opened. When the hatch cover is raised and also when it is lowered the movement thereof can be regulated by means of said throttle valve.

During the opening and closing movement the box 8 slides on the roller 10, and the box is preferably designed in such a way that during the entire movement it holds the yoke 15 in the plane containing the hinge bolt 12 of the pull rods 11 and the corresponding hinge bolt of the box 8 in the hatch cover lug means 6. Then the hydraulic motor is not exposed to any bending stresses whatever not even to such as arise by friction in the bolt connections.

To enable the pump to operate during the entire opening movement with, at least approximately, full effect, the hinge supports of the hatch covers have been designed in a special way. Thus the hatch cover is provided with a pair of toothed segments 18 which during the opening movement successively engage each with one rack in the shape of a row of pins 19 mounted on a bed at the hatch coaming. The row of pins is inclined upwards and away from the hatch, and by this arrangement the moment arm of the pulling link is reduced according as the weight moment of the hatch cover decreases by the upward swinging of said hatch cover.

To facilitate lowering the hatch cover, each side coaming is equipped in a manner known per se with a ramp 20, and the remote end of the hatch cover has a pair of rollers 21 which at the beginning of the closing movement rolls down the ramp.

The hatch cover can be retained in swung-open position by hydraulic blocking or special latches, and in this position the pulling link stands well protected behind the hatch cover and is entirely out of the way during loading and unloading.

What I claim and desire to secure by Letters Patent is:

1. A hydraulic opener for hinged hatch covers, comprising a support fixedly arranged above the plane of the hatch cover at the hinged end thereof, a pulling link hingedly connected between the hatch cover and said support, said pulling link being composed of two overlapping parts and adjustable in length by the displacement of said parts in relation to each other, and a hydraulic plunger motor of expansive action interposed between the overlapping ends of said link parts to shorten the pulling link by its expanding movement.

2. A hydraulic opener for hinged hatch covers as claimed in claim 1, in which one of the two over-lapping parts of the pulling link is an elongate box which has one end hingedly connected to the upper side of the hatch cover, said hydraulic plunger motor including a cylinder mounted in said elongate box, a plunger, and a yoke thereon which projects through and is guided in slots in the side walls of said box, the other part of the pulling link consisting of a pair of pull rods which are hingedly connected to the fixedly arranged support and to said yoke.

3. A hydraulic opener for hinged hatch covers as claimed in claim 2, in which the fixedly arranged support carries a roller which supports the free end of said elongate box, the bottom of said box being in the form of a curve such that during the entire movement of said box over said roller at the opening and closing of the hatch cover the box holds the hydraulic motor oriented in the plane of said pull rods.

References Cited in the file of this patent

UNITED STATES PATENTS

| | | |
|---|---|---|
| 656,699 | Paidassy | Aug. 28, 1900 |
| 2,322,372 | Levy | June 22, 1943 |
| 2,595,248 | Greer et al. | May 6, 1952 |
| 2,750,226 | Ash | June 12, 1956 |

FOREIGN PATENTS

| | | |
|---|---|---|
| 735,468 | Great Britain | Aug. 24, 1955 |